(12) United States Patent
Suzuki et al.

(10) Patent No.: US 11,191,225 B2
(45) Date of Patent: Dec. 7, 2021

(54) POWER-DRIVEN WORKING DEVICE

(71) Applicant: Yamabiko Corporation, Tokyo (JP)

(72) Inventors: Kenji Suzuki, Tokyo (JP); Hiroyuki Endo, Tokyo (JP)

( * ) Notice: Subject to any disclaimer, the term of this patent is extended or adjusted under 35 U.S.C. 154(b) by 0 days.

(21) Appl. No.: 17/008,490

(22) Filed: Aug. 31, 2020

(65) Prior Publication Data

US 2021/0059129 A1 Mar. 4, 2021

(30) Foreign Application Priority Data

Sep. 2, 2019 (JP) .............................. JP2019-159753

(51) Int. Cl.
*A01G 20/47* (2018.01)
*G05G 1/04* (2006.01)
*G05G 11/00* (2006.01)
*G06F 3/02* (2006.01)

(52) U.S. Cl.
CPC ............... *A01G 20/47* (2018.02); *G05G 1/04* (2013.01); *G05G 11/00* (2013.01); *G06F 3/0202* (2013.01)

(58) Field of Classification Search
CPC .................................................. G05G 11/00
See application file for complete search history.

(56) References Cited

U.S. PATENT DOCUMENTS

| 2016/0108924 A1* | 4/2016 | Conrad | A01G 20/43 |
| | | | 417/423.7 |
| 2016/0198636 A1* | 7/2016 | Poole | A47L 5/14 |
| | | | 15/327.5 |
| 2016/0265540 A1* | 9/2016 | Tirone | F04D 29/522 |
| 2017/0208748 A1* | 7/2017 | Yamaoka | E01H 1/0809 |

FOREIGN PATENT DOCUMENTS

| GB | 2513229 A | 10/2014 |
| WO | 2015176735 A1 | 11/2015 |
| WO | 2017192087 A1 | 11/2017 |

OTHER PUBLICATIONS

Extended European Search Report for Application No. 20193769.5; dated Nov. 23, 2020; 11 pp.

* cited by examiner

*Primary Examiner* — Vicky A Johnson
(74) *Attorney, Agent, or Firm* — Grumbles Law PLLC; Brittany Nanzig

(57) ABSTRACT

A power-driven working device including: a working tool; a drive unit configured to drive the working tool; a control unit configured to control an output power of the drive unit; and an operating unit including a first switch and a second switch, is provided. The control unit includes a cruise control unit configured to execute cruise control to maintain the output power of the drive unit constant when a cruise switch is activated, and an output power adjustment unit configured to increase the output power of the drive unit and to continue the cruise control when the first switch is activated during the cruise control, and to decrease the output power of the drive unit and to continue the cruise control when the second switch is activated during the cruise control.

9 Claims, 5 Drawing Sheets

POWER-DRIVEN WORKING DEVICE

CROSS REFERENCE TO RELATED APPLICATIONS

This application claims the foreign priority benefit under 35 U.S.C. § 119 of Japanese Patent Application No. 2019-159753 filed on Sep. 2, 2019, the disclosure of which is incorporated herein by reference.

FIELD OF THE INVENTION

The present invention relates to a power-driven working device.

BACKGROUND ART

A blower (a power-driven working device) configured to blow out an airflow includes a fan case that houses a fan, a drive unit that rotates the fan, a control unit that controls an output power of the drive unit, and an operating unit used to operate the drive unit. This blower can blow leaves and dust away by rotating the fan in the fan case and discharging the airflow to the outside from an air outlet connected to the fan case.

There has been a conventional blower in which an operating unit is provided with a trigger lever and a cruise button (see WO 2015/176735 A1, for example).

A control unit of the conventional blower is configured to change a wind speed of the airflow by increasing or decreasing the output power of the drive unit in accordance with an operating amount of the trigger lever. Meanwhile, when the cruise button is pressed during the operation of the trigger lever, the control unit of the conventional blower executes cruise control to maintain the output power of the drive unit constant. The wind speed of the airflow can be held constant during the cruise control.

In order to adjust the wind speed of the airflow during the cruise control of the conventional blower, it is necessary to discontinue the cruise control by placing back the trigger lever, then to set the airflow to a desired air volume while squeezing the trigger lever again, and then to press the cruise button. As mentioned above, the conventional blower has a problem of a complicated operation in order to adjust the output power of the drive unit during the cruise control.

SUMMARY OF THE INVENTION

The present invention has been made to solve the aforementioned problem, and an object thereof is to provide a power-driven working device which is capable of executing cruise control to maintain an output power of a drive unit constant, and of easily adjusting the output power of the drive unit during the cruise control.

In order to achieve the object, the present invention provides a power-driven working device which includes a working tool, a drive unit configured to drive the working tool, a control unit configured to control an output power of the drive unit, and an operating unit provided with a first switch and a second switch. The control unit includes a cruise control unit configured to execute cruise control to maintain the output power of the drive unit constant when a cruise switch is activated. The control unit also includes an output power adjustment unit configured to increase the output power of the drive unit and to continue the cruise control when the first switch is activated during the cruise control, and to decrease the output power of the drive unit and to continue the cruise control when the second switch is activated during the cruise control.

The power-driven working device of the present invention can execute the cruise control and maintain the output power of the drive unit constant by activating at least one of the first switch and the second switch. Moreover, the power-driven working device of the present invention can adjust the output power of the drive unit easily by activating the first switch or the second switch during the cruise control. As described above, the power-driven working device of the present invention can adjust the output power of the drive unit without discontinuing the cruise control.

Accordingly, the power-driven working device of the present invention can adjust the output power of the drive unit easily and smoothly in accordance with the work during the cruise control, thereby improving work efficiency.

DETAILED DESCRIPTION OF THE EMBODIMENTS

An embodiment of the present invention will be described in detail with reference to the drawings as appropriate.

Figure 1:
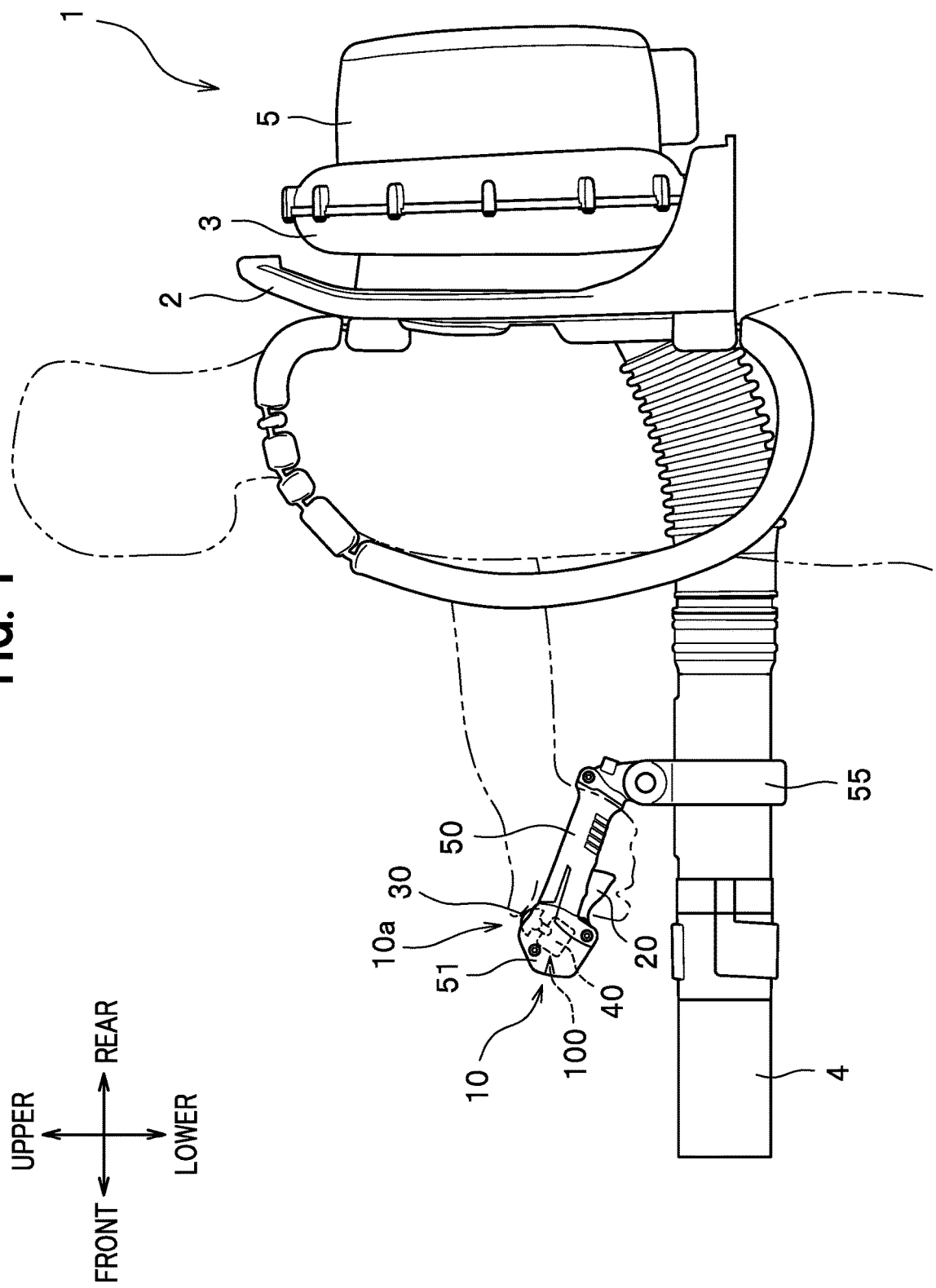
FIG. 1 is a side view showing a blower according to an embodiment of the present invention.

As shown in FIG. 1, a blower 1 of this embodiment is a power-driven working device that blows out an airflow. The blower 1 of this embodiment can be mounted on a backpack frame 2 so as to allow a worker to carry the blower 1 on the back.

The blower 1 can include a fan case 3 that houses a fan (not shown), an air outlet 4 connected to the fan case 3, a drive unit 5 that rotates the fan, a control unit 100 that controls an output power of the drive unit 5, and an operating unit 10 used to operate the drive unit 5.

The drive unit 5 can be an electric motor that is installed behind the fan case 3. The fan case 3 and the air outlet 4 are working tools to be driven by the drive unit 5. The airflow is generated in the fan case 3 by rotating the fan (not shown) in the fan case 3, and the airflow is discharged to the outside through the air outlet 4.

The worker can blow leaves and dust away by gripping a handgrip 50 provided to the air outlet 4 while carrying the blower 1 on the back and blowing a high-speed airflow from a tip end of the air outlet 4 onto the ground surface.

The handgrip 50 can be a cylindrical region extending in a front-rear direction. A base of the handgrip 50 can be connected to an attachment 55 attached to the air outlet 4. The handgrip 50 may be a portion to be gripped by the worker when the worker holds the air outlet 4.

A front end 51 of the handgrip 50 may be closed up. The front end 51 of the handgrip 50 may be provided with the operating unit 10.

The operating unit 10 can include a trigger lever 20 and an operating console 10a. The worker can increase, decrease, or maintain the output power of the drive unit 5 by operating the trigger lever 20 and the operating console 10a.

Figure 2:
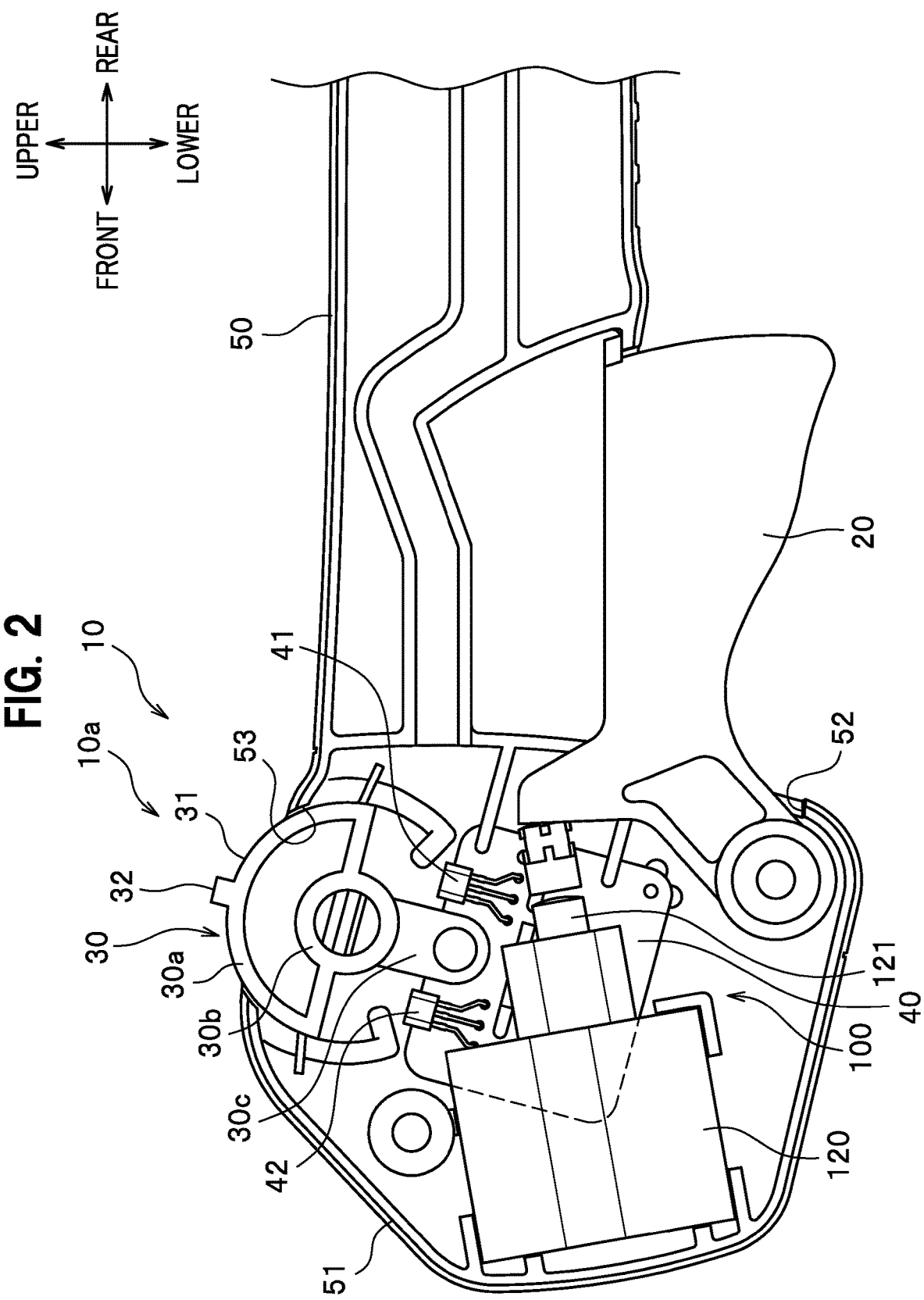
FIG. 2 is a transverse sectional view showing an operating unit of the blower according to the embodiment of the present invention.

As shown in FIG. 2, the trigger lever 20 may project downward from a lower opening 52 that is formed on a lower surface of the front end 51 of the handgrip 50. A front end of the trigger lever 20 can be inserted into the handgrip 50. The front end of the trigger lever 20 may be connected in such a way as to be tiltable in an upper-lower direction relative to the handgrip 50. Moreover, by tilting the trigger lever 20 in the upper-lower direction relative to the handgrip 50, the trigger lever 20 can go in and out of the lower opening 52.

The worker can tilt the trigger lever 20 upward by placing fingers on a lower edge of the trigger lever 20 while grabbing the handgrip 50 by hand and then squeezing the trigger lever 20. The trigger lever 20 may be configured to return to an initial position when the worker reduces the squeezing force on the trigger lever 20.

The operating console 10a can include an operating lever 30. The operating lever 30 may be housed in an upper part of the front end 51 of the handgrip 50. An intermediate part 30b in an upper-lower direction of the operating lever 30 can be connected in such a way as to be turnable pivotally in a right-left direction relative to the handgrip 50. Thus, an upper part 30a and a lower part 30c of the operating lever 30 may be tiltable in the front-rear direction relative to the handgrip 50.

The upper part 30a of the operating lever 30 can be an upper semicircular member and its upper surface 31 can be curved into an arc shape. The upper surface 31 of the operating lever 30 may project outward from an upper opening 53 that is formed on an upper surface of the handgrip 50. A protrusion 32 can project from an intermediate part in a front-rear direction of the upper surface 31 of the operating lever 30.

The lower part 30c of the operating lever 30 can project straight downward from an intermediate part of a lower edge of the upper part 30a. The lower part 30c of the operating lever 30 may be located on the left side of a switch board 40 (described later).

The operating lever 30 and the trigger lever 20 can be located at the top and bottom of the front end 51 of the handgrip 50. The operating lever 30 may be located ahead of the trigger lever 20.

The worker can tilt the operating lever 30 in the front-rear direction by gripping the handgrip 50 by hand and pushing and pulling the protrusion 32 of the operating lever 30 in the front-rear direction with the thumb while placing the fingers on the trigger lever 20.

The operating lever 30 may be used to activate a first switch 41 and a second switch 42 provided to the switch board 40 (described later). Here, a detection member (e.g., a magnet) to be detected by the first switch 41 and the second switch 42 can be attached to the lower part 30c of the operating lever 30.

When the worker places the thumb on the upper part 30a of the operating lever 30 and tilts the upper part 30a forward by moving the thumb forward, the lower part 30c of the operating lever 30 can be tilted rearward and the lower part 30c can come close to the first switch 41. Thus, the first switch 41 can be changed from an off-state to an on-state. Meanwhile, the first switch 41 may be changed from the on-state to the off-state when the lower part 30c of the operating lever 30 is tilted forward and the lower part 30c moves away from the first switch 41.

When the worker places the thumb on the upper part 30a of the operating lever 30 and tilts the upper part 30a rearward by moving the thumb rearward, the lower part 30c of the operating lever 30 can be tilted forward and the lower part 30c can come close to the second switch 42. Thus, the second switch 42 can be changed from an off-state to an on-state. Meanwhile, the second switch 42 may be changed from the on-state to the off-state when the lower part 30c of the operating lever 30 is tilted rearward and the lower part 30c moves away from the second switch 42.

The control unit 100 may be configured to control the output power of the drive unit 5 (see FIG. 1). The control unit 100 can include the switch board 40, a control board 110 (see FIG. 4), and a detection switch 120. The control unit 100 can increase or decrease the number of revolutions of an output shaft (not shown) of the drive unit 5. Moreover, as the output power of the drive unit 5 is increased or decreased, the number of revolutions of the fan (not shown) in the fan case 3 can be increased or decreased, thereby increasing or decreasing the wind speed of the airflow discharged from the air outlet 4.

The switch board 40 may be housed in the front end 51 of the handgrip 50. The switch board 40 can be formed by attaching electronic components such as a CPU and a memory to a square board on which an electric circuit is printed. The switch board 40 may be electrically connected to the control board 110 (see FIG. 4) and the drive unit 5 (see FIG. 1) by using a cable (not shown).

Figure 3:
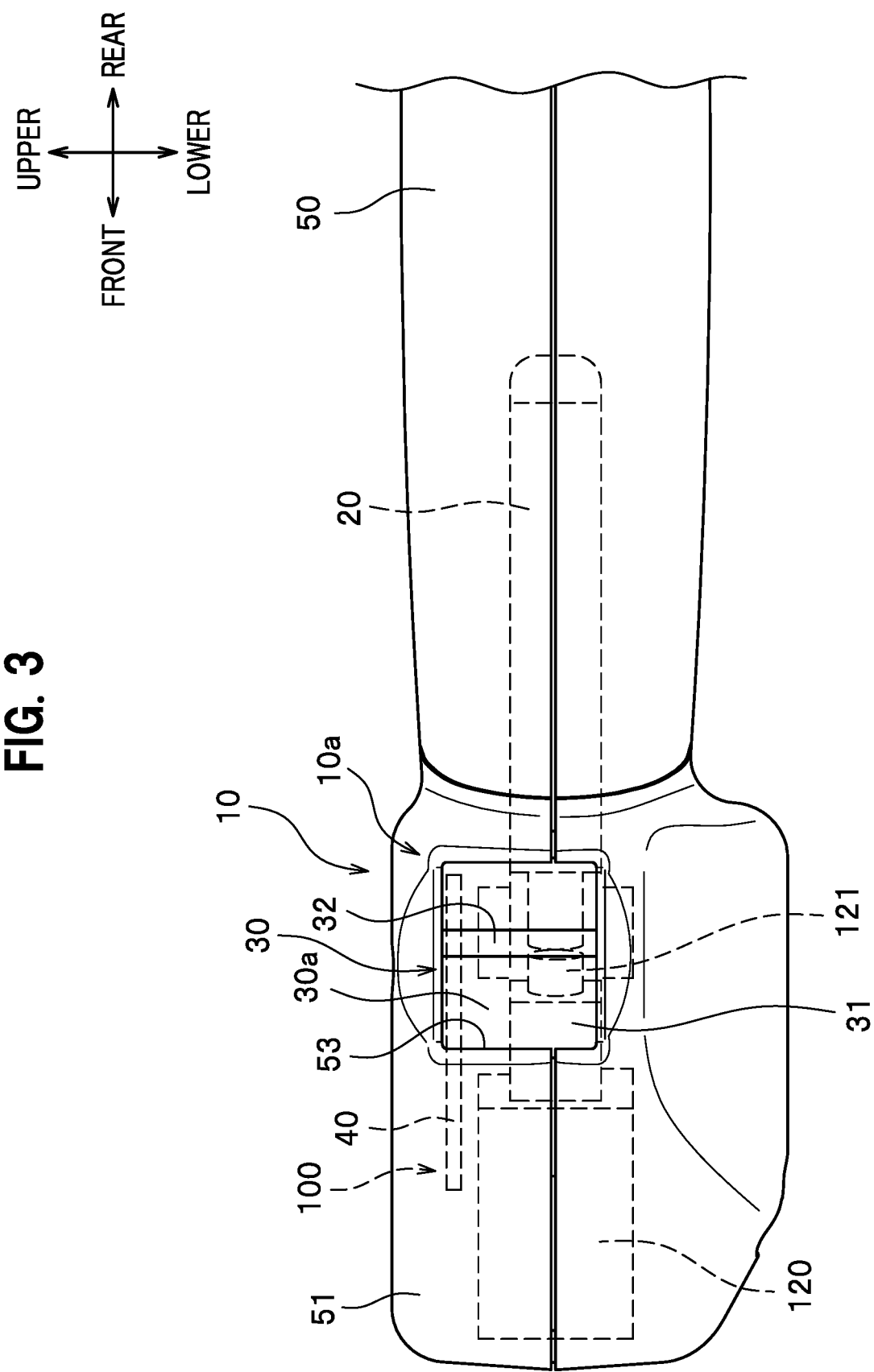
FIG. 3 is a plan view showing the operating unit of the blower according to the embodiment of the present invention.

The switch board 40 may be housed in the front end 51 of the handgrip 50 in a state where two surfaces of the switch board 40 are located on the right and left. As shown in FIG. 3, the trigger lever 20, the operating lever 30, and the detection switch 120 can be located on one side (the left side in this embodiment) of the switch board 40. According to this configuration, the trigger lever 20, the operating lever 30, and the switch board 40 of the operating unit 10 can be compactly housed in the front end 51 of the handgrip 50.

Figure 4:
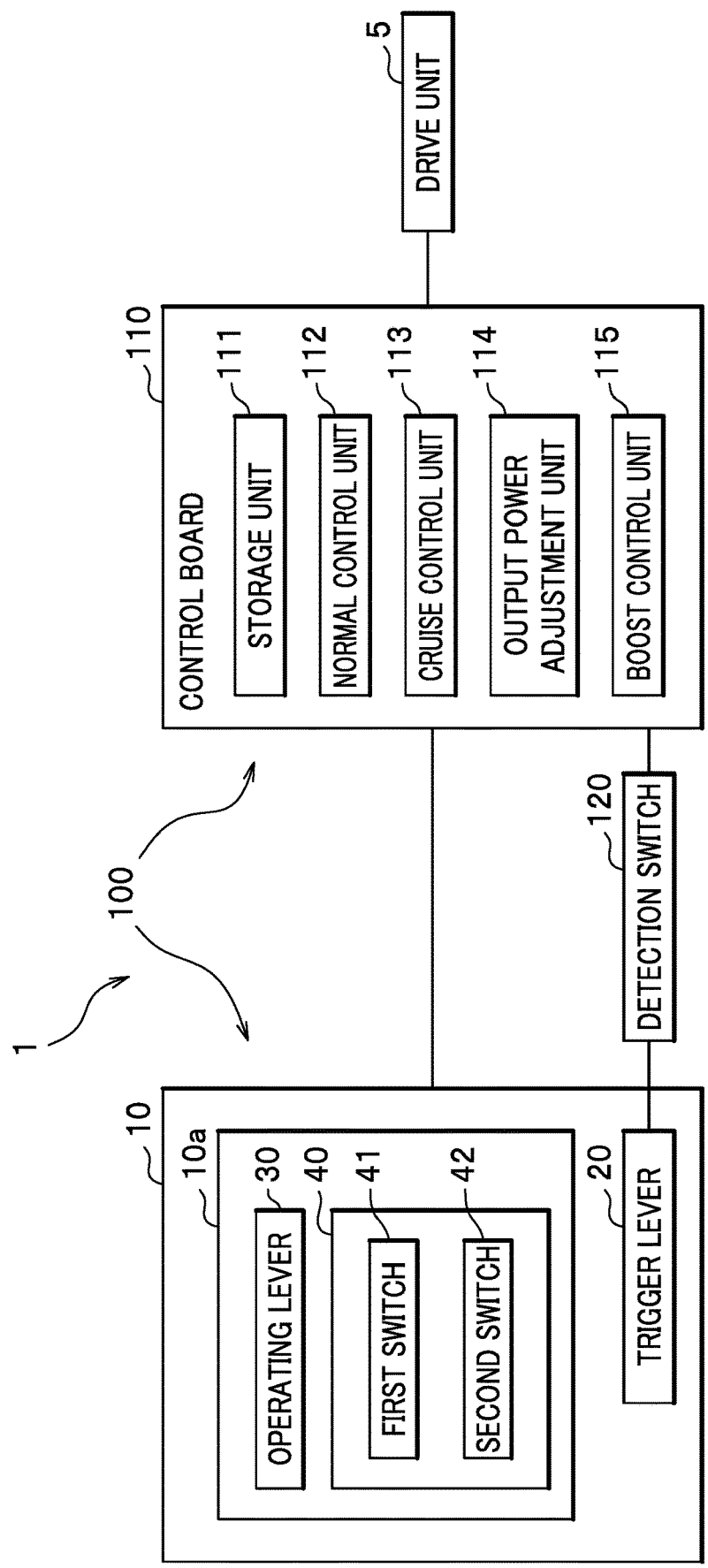
FIG. 4 is a block diagram showing a control unit of the blower according to the embodiment of the present invention.

As shown in FIG. 4, the detection switch 120 may be electrically connected to the control board 110. The detection switch 120 may be provided with a detection shaft 121 to be pushed in by the trigger lever 20 when the trigger lever 20 is tilted upward. The detection switch 120 can detect an operating amount (a tilting amount) of the trigger lever 20 based on an amount of push of the detection shaft 121, and can output the operating amount to the control board 110.

The control board 110 may be formed by attaching electronic components such as the CPU and the memory onto the board on which the electronic circuit is printed. In this embodiment, the control board 110 may be located near the drive unit 5.

The control board 110 can include a storage unit 111, a normal control unit 112, a cruise control unit 113, an output power adjustment unit 114, and a boost control unit 115.

Processing in each unit on the control board 110 may be implemented by causing the CPU to execute programs stored in the storage unit 111 in advance.

The normal control unit 112 may be configured to execute normal control to increase or decrease the output power of the drive unit 5 in accordance with the operating amount (the tilting amount) of the trigger lever 20.

The normal control unit 112 can increase the output power of the drive unit 5 when the worker squeezes the trigger lever 20 and decrease the output power of the drive unit 5 when the worker releases the trigger lever 20.

The cruise control unit 113 can be configured to execute cruise control to maintain the output power of the drive unit 5 constant.

When the upper part 30a (see FIG. 2) of the operating lever 30 is tilted rearward during the normal control and the second switch 42 is thus activated, the cruise control unit 113 can maintain the same output power of the drive unit 5 at an output power when the second switch 42 is activated. In other words, the cruise control unit 113 can maintain the output power of the drive unit 5 at the output power at the time when the cruise control is started. As described above, the second switch 42 can serve as a cruise switch to execute the cruise control in this embodiment.

Here, the output power of the drive unit 5 suitable for the cruise control may be determined and stored in the storage unit 111 in advance, and the cruise control unit 113 may be configured to maintain the output power of the drive unit 5 at the time of the cruise control at the predetermined output power.

The cruise control unit 113 can maintain the output power of the drive unit 5 at the preset output power even when the trigger lever 20 is squeezed further during the cruise control.

The cruise control unit 113 can discontinue the cruise control when the trigger lever 20 is placed back during the cruise control. In this case, the normal control is executed by the normal control unit 112.

The output power adjustment unit 114 may be configured to adjust the output power of the drive unit 5 during the cruise control.

When the upper part 30a (see FIG. 2) of the operating lever 30 is tilted forward during the cruise control and the first switch 41 is thus activated, the output power adjustment unit 114 can increase the output power of the drive unit 5 and continue the cruise control.

When the upper part 30a (see FIG. 2) of the operating lever 30 is tilted rearward during the cruise control and the second switch 42 is thus activated, the output power adjustment unit 114 can decrease the output power of the drive unit 5 and continue the cruise control.

In this embodiment, the output power of the drive unit 5 may be changed stepwise every time when any of the first switch 41 and the second switch 42 is activated. Alternatively, the output power of the drive unit 5 may be changed depending on a length of time of tilting the operating lever 30.

The boost control unit 115 may be configured to execute boost control to increase the output power of the drive unit 5 more than the output power at the time of the normal control.

When the upper part 30a (see FIG. 2) of the operating lever 30 is tilted forward during the normal control and the first switch 41 is thus activated, the boost control unit 115 can execute the boost control.

Note that the boost control unit 115 may be configured not to execute the boost control when the operating lever 30 is tilted in the state where the trigger lever 20 is not moved.

Next, a method of operating the blower 1 of this embodiment will be described. The below description will be given with reference to a flowchart in FIG. 5.

Figure 5:
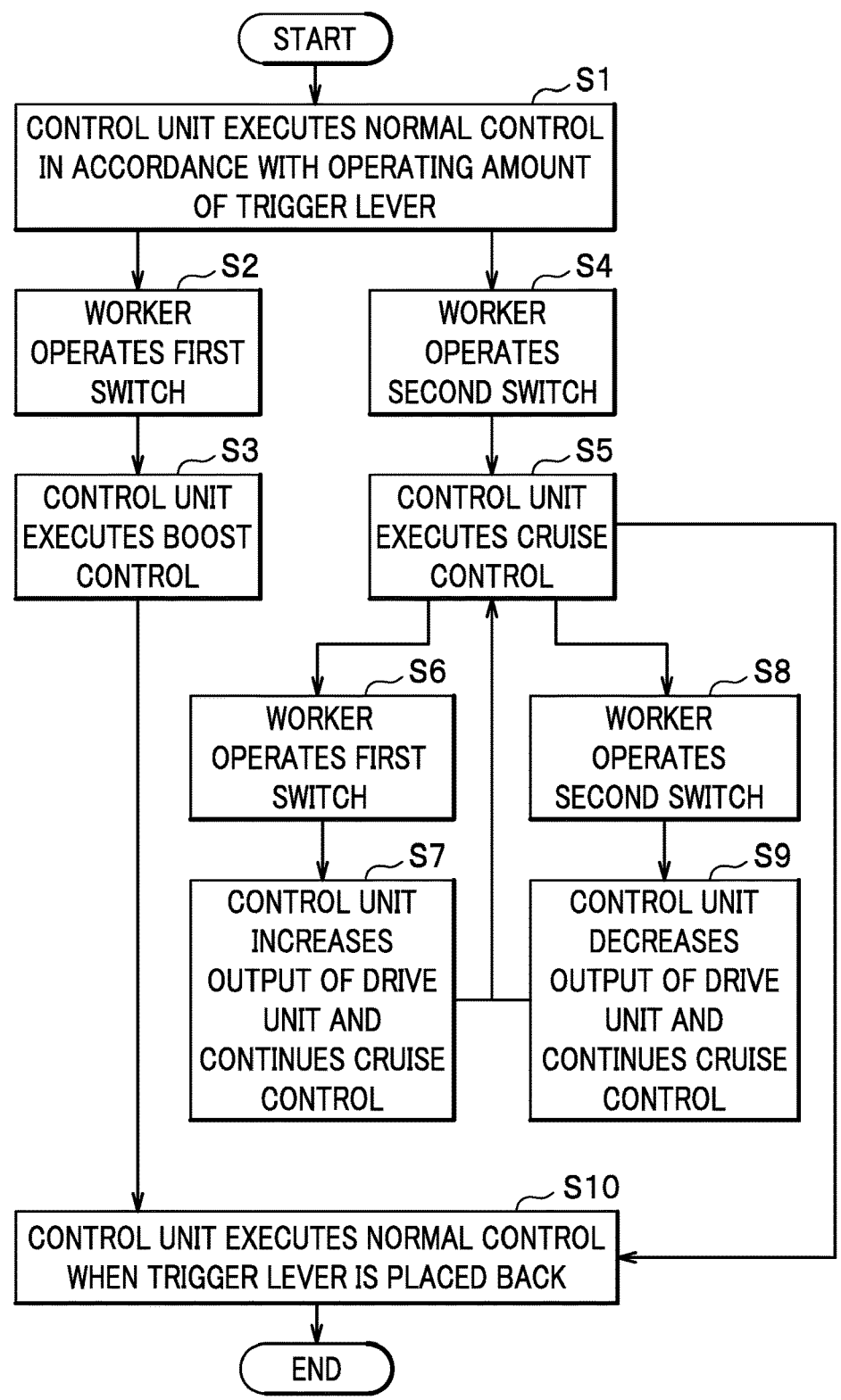
FIG. 5 is a flowchart showing control of the blower according to the embodiment of the present invention.

First, when the worker carrying the blower 1 on the back grips the handgrip 50 and squeezes the trigger lever 20 of the operating unit 10 as shown in FIG. 1, the normal control unit 112 shown in FIG. 4 can execute the normal control and increase or decrease the output power of the drive unit 5 in accordance with the operating amount of the trigger lever 20 (step S1 in FIG. 5).

Thus, the worker can increase or decrease the number of revolutions of the fan (not shown) in the fan case 3 shown in FIG. 1, and blow leaves and dust away by blowing the airflow onto the ground while adjusting the wind speed of the airflow discharged from the tip end of the air outlet 4.

In the case of increasing the wind speed of the airflow, the worker can activate the first switch 41 by tilting the upper part 30a of the operating lever 30 shown in FIG. 2 forward (step S2 in FIG. 5).

By doing so, the boost control unit 115 shown in FIG. 4 can execute the boost control and increase the output power of the drive unit 5 more than the output power at the time of the normal control (step S3 in FIG. 5).

In this manner, the worker can increase the number of revolutions of the fan (not shown) in the fan case 3 shown in FIG. 1 and increase the wind speed of the airflow discharged from the air outlet 4.

When the trigger lever 20 is placed back during the boost control, the boost control unit 115 shown in FIG. 4 can discontinue the boost control, and the normal control can be executed by the normal control unit 112 (step S10 in FIG. 5).

In the case of maintaining the wind speed of the airflow constant during the normal control, the worker can activate the second switch 42 serving as the cruise switch by tilting the upper part 30a of the operating lever 30 shown in FIG. 2 rearward (step S4 in FIG. 5).

By doing so, the cruise control unit 113 shown in FIG. 4 can execute the cruise control and maintain the output power of the drive unit 5 at the output power at the time when the second switch 42 is activated (step S5 in FIG. 5).

In this manner, the number of revolutions of the fan (not shown) in the fan case 3 shown in FIG. 1 can be kept constant. Hence, the wind speed of the airflow discharged from the air outlet 4 can be kept constant even when the trigger lever 20 is squeezed further.

When the worker intends to continue the cruise control while increasing the wind speed of the airflow, the worker can tilt the upper part 30a of the operating lever 30 shown in FIG. 2 forward and activate the first switch 41 (step S6 in FIG. 5).

By doing so, the output power adjustment unit 114 shown in FIG. 4 can continue the cruise control while increasing the output power of the drive unit 5 (step S7 in FIG. 5).

In this manner, the number of revolutions of the fan (not shown) in the fan case 3 shown in FIG. 1 may be increased, and the wind speed of the airflow discharged from the air outlet 4 can be kept constant at the increased state.

In order to control the cruise control by further increasing the output power of the drive unit 5, the above-described operation to increase the output power may be repeated.

When the worker intends to continue the cruise control while decreasing the wind speed of the airflow, the worker can tilt the upper part 30a of the operating lever 30 shown in FIG. 2 rearward and activate the second switch 42 (step S8 in FIG. 5).

By doing so, the output power adjustment unit 114 shown in FIG. 4 can continue the cruise control while decreasing the output power of the drive unit 5 (step S9 in FIG. 5).

In this manner, the number of revolutions of the fan (not shown) in the fan case 3 shown in FIG. 1 can be decreased, and the wind speed of the airflow discharged from the air outlet 4 can be kept constant at the decreased state.

In order to control the cruise control by further decreasing the output power of the drive unit 5, the above-described operation to decrease the output power may be repeated.

Meanwhile, an air volume may be increased in accordance with the above-described operation to increase the output power in the case where the output power of the drive unit 5 is decreased too much, and the output power of the drive unit 5 may be decreased in accordance with the above-described operation to decrease the output power in the case where the output power of the drive unit 5 is increased too much.

When the trigger lever 20 is placed back during the cruise control, the cruise control unit 113 shown in FIG. 4 can discontinue the cruise control and the normal control can be executed by the normal control unit 112 (step S10 in FIG. 5).

As shown in FIG. 1, the above-described blower 1 (the power-driven working device) may include the fan case 3 as well as the air outlet 4 (the working tools), the drive unit 5 that drives the fan (not shown) in the fan case 3, and the control unit 100 that controls the output power of the drive unit 5. Moreover, as shown in FIG. 2, the blower 1 can include the operating unit 10 provided with the first switch 41 and the second switch 42.

As shown in FIG. 4, the control unit 100 can include the cruise control unit 113 that executes the cruise control to maintain the output power of the drive unit 5 constant when the second switch 42 serving as the cruise switch is activated. Moreover, the control unit 100 can include the output power adjustment unit 114 that continues the cruise control while increasing the output power of the drive unit 5 when the first switch 41 is activated during the cruise control, and continues the cruise control while decreasing the output power of the drive unit 5 when the second switch 42 is activated during the cruise control.

The operating unit 10 of the blower 1 of this embodiment can include the trigger lever 20. Moreover, the control unit 100 can include the normal control unit 112 that executes the normal control to increase or decrease the output power of the drive unit 5 in accordance with the operating amount of the trigger lever 20. Meanwhile, the cruise control unit 113 can be configured to maintain the output power of the drive unit 5 at the time of the cruise control at the output power at the time when the cruise control is started.

According to the blower 1 of this embodiment, the output power of the drive unit 5 can be increased or decreased easily by activating the first switch 41 or the second switch 42 during the cruise control. Thus, it is possible to continue the cruise control while increasing or decreasing the output power of the drive unit 5.

Accordingly, the blower 1 of this embodiment can easily and smoothly adjust the output power of the drive unit 5 in accordance with the work during the cruise control, thereby improving work efficiency.

In the blower 1 of this embodiment, the operating unit 10 can be provided to the handgrip 50 that extends in the front-rear direction. Accordingly, the operating unit 10 can be operated easily with one hand.

Moreover, the operating console 10a including the operating lever 30 can be provided at a front part of the handgrip 50. Accordingly, the operating console 10a can be operated easily with one hand.

Furthermore, the operating console 10a may be provided at the front part of the handgrip 50 and in a movable range of the thumb of the worker. Accordingly, the operating console 10a can be operated easily with the thumb. In some cases, the worker can adjust the output power of the drive unit 5 by operating the operating console 10a without looking at the operating console 10a but watching a work target during the work instead.

The blower 1 of this embodiment can use the second switch 42 as the cruise switch. Thus, it is possible to downsize the operating unit 10 and to reduce manufacturing costs. In addition, the worker can operate the operating console 10a comfortably.

The blower 1 of this embodiment is configured to determine the output power of the drive unit 5 at the time when the cruise control is started, by activating the first switch 41 or the second switch 42 in the state of the output power (the wind speed of the airflow) of the drive unit 5 with an arbitrary position of the trigger lever 20. Thus, the worker can set the output power of the drive unit 5 at the time of the cruise control to the output power that is suitable for the work.

The cruise control unit 113 of this embodiment can be configured to discontinue the cruise control when the trigger lever 20 is moved in a direction back to the initial position during the cruise control. According to this configuration, the cruise control can be discontinued easily.

Meanwhile, since the drive unit 5 of the blower 1 of this embodiment may be the electric motor, it may be preferable to stop the drive unit 5 completely when the trigger lever 20 is placed back to the initial position. By doing so, the output power of the drive unit 5 becomes zero and it is possible to reduce waste power consumption in a standby state, so that the user can conduct the work comfortably. In addition, the worker can resume the work easily by a simple operation such as gripping the trigger lever 20.

In addition, according to the blower 1 of this embodiment, the trigger lever 20 and the operating console 10a can be provided to the handgrip 50. This allows worker to operate the operating console 10a with one hand while operating the trigger lever 20.

The control unit 100 of this embodiment can include the boost control unit 115 that executes the boost control to increase the output power of the drive unit 5 more than the output power at the time of the normal control. The cruise control unit 113 may execute the cruise control when the first switch 41 is activated. Meanwhile, the boost control unit 115 may execute the boost control when the second switch 42 is activated.

This configuration can improve work efficiency since the cruise control or boost control can be easily selected in accordance with the work.

According to the blower 1 of this embodiment, a single switch may used as the switch to increase and decrease the output power (the wind speed of the airflow) of the drive unit 5 at the time of the cruise control, the switch to execute the cruise control, and the switch to execute the boost control.

This configuration can downsize the blower 1 and contribute to reduction in manufacturing costs. Moreover, an operation range of the operating console 10a for the worker becomes smaller. Accordingly, the worker can operate the operating console 10a easily.

The operating console 10a of the blower 1 of this embodiment may be designed to cause the worker to move the thumb rear in order to execute the cruise control and to move the thumb forward in order to execute the boost control.

As described above, the thumb can be moved forward in order to increase the output power (the wind speed of the airflow) of the drive unit 5 and can be moved rearward in order to stop the increase in the output power (the wind speed of the airflow) of the drive unit 5. Hence, it is unlikely that the worker makes a mistake in operating the operating console 10a.

The operating console 10a of the operating unit 10 of this embodiment can be provided with the operating lever 30. Moreover, one of the first switch 41 or the second switch 42 can be activated when the operating lever 30 is tilted to one of the forward and rearward directions, and the other one of the first switch 41 or the second switch 42 can be activated when the operating lever 30 is tilted to the other one of the forward and rearward directions. This configuration allows the worker to activate the first switch 41 and the second switch 42 easily.

Meanwhile, the operating unit 10 of this embodiment can be configured such that the first switch 41 is activated when the operating lever 30 is tilted forward and the second switch 42 is activated when the operating lever 30 is tilted rearward.

According to this configuration, the worker can increase the output power (the wind speed of the airflow) of the drive unit 5 by moving the thumb forward and decrease the output power of the drive unit 5 by moving the thumb rearward. Hence, it is unlikely that the worker makes a mistake in operating the operating console 10a.

According to the blower 1 of this embodiment, the operating unit 10 may be provided to the handgrip 50 that extends in the front-rear direction, so that the worker can easily operate the operating unit 10 by gripping the handgrip 50 by hand.

In addition, the operating console 10a of the operating unit 10 can be provided at a front part of the handgrip 50, so that the worker can easily operate the operating console 10a by gripping the handgrip 50 by hand.

Moreover, the operating console 10a can be provided at the front part of the handgrip 50 and in the movable range of the thumb of the worker. Accordingly, the operating console l0a can be operated easily with the thumb.

In this embodiment, the first switch 41, which can be used to decrease the output power (the wind speed of the airflow) of the drive unit 5, may be located on the rear side, and the second switch 42, which can be used to increase the output power (the wind speed of the airflow) of the drive unit 5, may be located on the front side.

According to this configuration, the output power (the wind speed of the airflow) of the drive unit 5 can be increased when the worker moves the thumb forward and the output power (the wind speed of the airflow) of the drive unit 5 can be decreased when the worker moves the thumb rearward. Hence, it is unlikely that the worker makes a mistake in operating the operating console 10a when increasing or decreasing the wind speed of the airflow.

As described above, the blower 1 of this embodiment may be configured to allow the worker to activate the first switch 41 and the second switch 42 by moving the thumb forward and backward. According to this configuration, it is possible to activate the first switch 41 and the second switch 42 easily.

While the embodiment of the present invention has been described above, the present invention is not limited only to this embodiment and may be modified without departing from the scope of the invention.

As shown in FIG. 4, the blower 1 of this embodiment can execute the boost control when the first switch 41 is activated by tilting the upper part 30a (see FIG. 2) of the operating lever 30 forward. Meanwhile, the blower 1 of this embodiment may be configured to execute the cruise control when the second switch 42 is activated by tilting the upper part 30a (see FIG. 2) of the operating lever 30 rearward.

However, the blower 1 may be configured to execute the boost control by activating the first switch 41 when the upper part 30a (see FIG. 2) of the operating lever 30 is tilted rearward, and to execute the cruise control by activating the second switch 42 when the upper part 30a (see FIG. 2) of the operating lever 30 is tilted forward.

In this embodiment, the first switch 41 and the second switch 42 can be arranged in the front-rear direction and the first switch 41 may be located on the rear side while the second switch 42 may be located on the front side, as shown in FIG. 2. However, the first switch 41 may be located on the front side and the second switch 42 may be located on the rear side.

In addition, the first switch 41 and the second switch 42 may be arranged in the right-left direction, and the first switch 41 and the second switch 42 may be configured to be activated by tilting the operating lever 30 in the right-left direction.

In the blower 1 of this embodiment, the operating lever 30 can serve as both the first switch 41 and the second switch 42. Alternatively, the first switch 41 and the second switch 42 may be formed from levers or buttons that are independent of each other. In this case as well, by configuring the blower 1 to increase the output power (the wind speed of the airflow) of the drive unit 5 when the worker moves the thumb forward and to decrease the output power (the wind speed of the airflow) of the drive unit 5 when the worker moves the thumb rearward, it is unlikely that the worker makes a mistake in operating the operating console 10a when increasing or decreasing the wind speed of the airflow. Alternatively, the blower 1 may be configured to execute the cruise control when both of the first switch 41 and the second switch 42 are activated.

The blower 1 of this embodiment may be configured to allow the worker to activate the first switch 41 and the second switch 42 by tilting the operating lever 30 in the front-rear direction. Alternatively, the worker may activate the first switch 41 and the second switch 42 by moving the operating lever 30 in an upper-lower direction. In this case, the blower 1 may be configured to increase the output power of the drive unit 5 when the worker moves the operating lever 30 upward and to decrease the output power of the drive unit 5 when the worker moves the operating lever 30 downward. In this manner, it is unlikely that the user makes a mistake in operating the operating console 10a.

In the case where the cruise control unit 113 of this embodiment shown in FIG. 4 is configured to maintain the output power of the drive unit 5 at the time of starting the cruise control at a predetermined output power stored in the storage unit 111 in advance, it is possible to execute the cruise control at an output power suitable for the work.

As shown in FIG. 1, the blower 1 of this embodiment can be a backpack blower, which may be mounted on the backpack frame 2. Nonetheless, the present invention is also applicable to a handheld blower used by being held in the hands of the worker.

Although the handheld blower may impose a large load on the arms and the hands in some cases as the worker supports the fan and the power source by using the arms and the hands, manipulation of the handheld blower may be facilitated by applying the present invention to the handheld blower. As mentioned above, the present invention is also suitable for the handheld blower.

In the blower 1 of this embodiment, the control board 110 is not disposed in the handgrip 50. However, a board obtained by integrating the control board 110 and the switch board 40 together may be disposed in the handgrip 50.

In the blower 1 of this embodiment, the drive unit 5 can adopt the electric motor as the drive source. However, the configuration of the drive source is not limited to this embodiment, and an engine may be used as the drive source, for example.

The embodiment has been described as the blower 1. However, the power-driven working device of the present invention is not limited to the blower. The present invention is also applicable to various types of power-driven working devices including a brush cutter, a hedge trimmer, a chain saw, and the like.

What is claimed is:

1. A power-driven working device comprising:
a working tool;
a drive unit configured to drive the working tool;
a control unit configured to control an output power of the drive unit; and
an operating unit including a first switch and a second switch, wherein
the control unit includes
a cruise control unit configured to execute cruise control to maintain the output power of the drive unit constant when a cruise switch is activated, and
an output power adjustment unit configured to increase the output power of the drive unit and to continue the cruise control when the first switch is activated during the cruise control, and to decrease the output power of the drive unit and to continue the cruise control when the second switch is activated during the cruise control,
the operating unit is provided with an operating lever,
the first switch is activated when the operating lever is tilted in a first direction, and
the second switch is activated when the operating lever is tilted in a second direction.

2. The power-driven working device according to claim 1, wherein
the first switch is configured to be activated by causing a worker to move a finger in at least one of forward and upward directions, and
the second switch is configured to be activated by causing the worker to move the finger in at least one of rearward and downward directions.

3. The power-driven working device according to claim 2, wherein the cruise switch is at least one of the first switch and the second switch.

4. The power-driven working device according to claim 3, wherein
the operating unit includes a trigger lever, and
the cruise control unit discontinues the cruise control when the trigger lever is moved in a direction back to an initial position during the cruise control.

5. The power-driven working device according to claim 3, wherein
the operating unit includes a trigger lever,
the control unit includes
a normal control unit configured to execute normal control to increase or decrease the output power of the drive unit in accordance with an operating amount of the trigger lever, and
a boost control unit configured to execute boost control to increase the output power of the drive unit more than an output power at the time of the normal control, and
the boost control unit executes the boost control when the other one of the first switch and the second switch is activated.

6. The power-driven working device according to claim 1, wherein
the first direction is at least one of forward and upward directions, and
the second direction is at least one of rearward and downward directions.

7. The power-driven working device according to claim 6, wherein the cruise switch is at least one of the first switch and the second switch.

8. The power-driven working device according to claim 7, wherein
the operating unit includes a trigger lever, and
the cruise control unit discontinues the cruise control when the trigger lever is moved in a direction back to an initial position during the cruise control.

9. The power-driven working device according to claim 7, wherein
the operating unit includes a trigger lever,
the control unit includes
a normal control unit configured to execute normal control to increase or decrease the output power of the drive unit in accordance with an operating amount of the trigger lever, and
a boost control unit configured to execute boost control to increase the output power of the drive unit more than an output power at the time of the normal control, and
the boost control unit executes the boost control when the other one of the first switch and the second switch is activated.

* * * * *